June 25, 1929.   C. NELSON   1,718,798
FURNACE
Filed Oct. 23, 1926    2 Sheets-Sheet 2

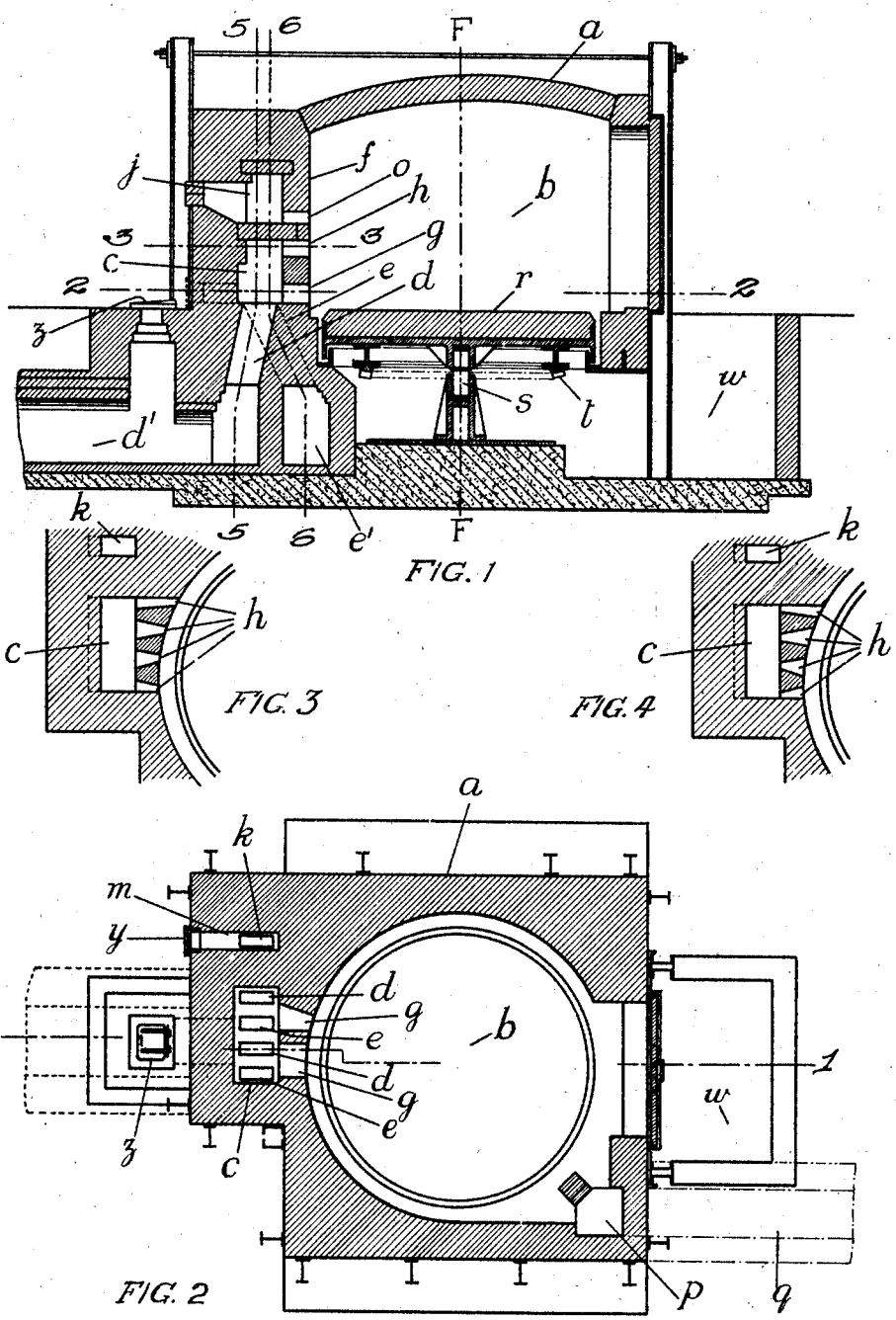

Inventor
CLIFFORD NELSON,

Patented June 25, 1929.

1,718,793

UNITED STATES PATENT OFFICE.

CLIFFORD NELSON, OF SHEFFIELD, ENGLAND.

FURNACE.

Application filed October 23, 1926, Serial No. 143,583, and in Great Britain October 30, 1925.

This invention relates to furnaces, more particularly annealing, heat treatment and like furnaces.

A furnace made in accordance with this invention is characterized by a primary air and fuel inlet communicating with a chamber alongside said furnace at or about the floor level, a secondary air inlet likewise communicating into said chamber, inlets from the chamber communicating into the furnace at or about the floor level and at a distance above, a secondary chamber alongside the furnace and disposed still higher up communicating with a tertiary air inlet and an inlet from said secondary chamber communicating into the furnace. Means are provided for suitably preheating the secondary air and also for permitting the tertiary air to be, or not to be, heated as desired.

Referring to the drawings filed herewith:—

Fig. 1 is a sectional elevation of one form of furnace made according to this invention taken on a line 1—1, Fig. 2, which is a section on a line 2—2, Fig. 1;

Fig. 3 is a fragmentary sectional plan on the line 3—3, Fig. 1;

Fig. 4 is a similar view showing a modification;

$a$ is a furnace. $b$ the furnace or combustion chamber with arched roof. Alongside the chamber $b$ at or about the floor level is a separate fuel and air mixing chamber $c$ into which fuel is conveyed through passages $d$ from flues $d'$ and a restricted amount of secondary air through passages $e$ from flues $e'$. In the wall $f$ separating the mixing chamber $c$ from the interior of the furnace combustion chamber are arranged inlets $g$ at or about the floor level of the furnace and smaller inlets $h$ at a higher level, through all of which a mixture of fuel and secondary air is adapted to pass into the furnace or combustion chamber, about 75% of the mixture passing through the inlets $g$ and the remaining 25% through the inlets $h$, and as the amount of secondary air is restricted, partial combustion only takes place within the furnace or combustion chamber, and owing to the situation of the inlets $g$ and $h$, the combustible mixture travels along or near the lower part of the furnace to rise at the centre or thereabouts.

Figure 5:
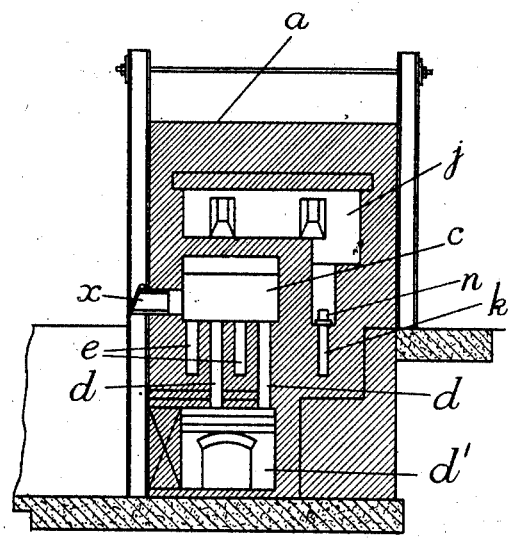
Fig. 5 is a vertical section on a line 5—5, Fig. 1.
Figure 6:
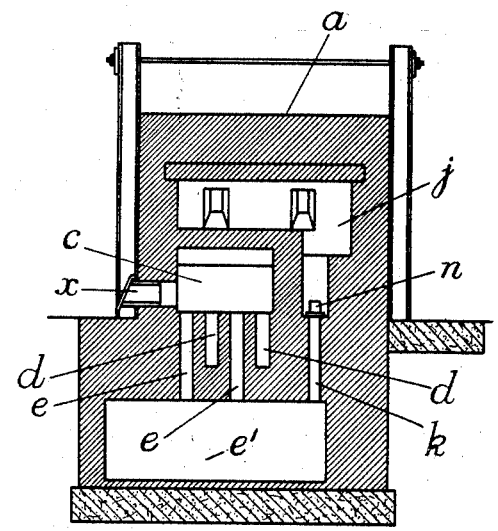
Fig. 6 is a similar view on the line 6—6, Fig. 1.
Figure 7:
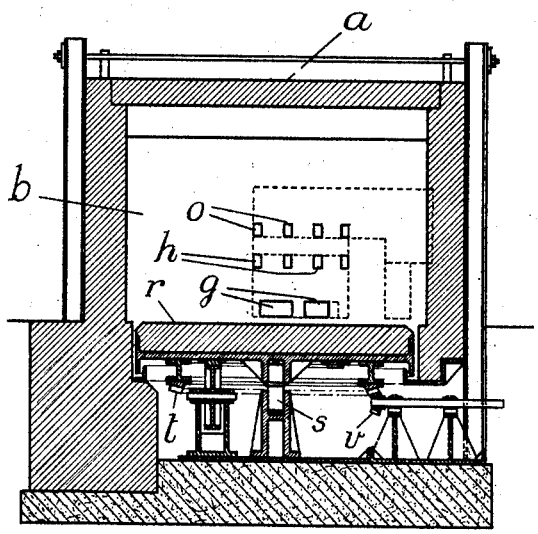
Fig. 7 is a vertical section on a line F—F, Fig. 1.

Immediately above the mixing chamber $c$ is a tertiary air supply chamber $j$ into which passes tertiary air admitted from a flue $k$ or direct from atmosphere through an inlet $m$. The flue $k$ may conveniently be connected to the secondary air passages $e$ for the supply of tertiary air as shown in Fig. 6. In order to use either the flue $k$ or the inlet $m$ or both, a damper $n$ over the flue $k$ can be operated so as to regulate or vary the supply of tertiary air. Communicating from the tertiary air supply chamber $j$ into the furnace chamber $b$ are flues $o$ arranged in the wall $f$ and as the tertiary air unites with the mixture already in the chamber $b$, complete combustion immediately takes place in the upper portion of the furnace chamber, thereby producing an oxidizing or reducing atmosphere according to the quantity of air admitted. $p$ is an exhaust flue from the furnace chamber to the chimney flue $q$. As will be seen in Fig. 3, the inlets $h$ from the chamber $c$ are, or may be, tapered towards the furnace chamber, or, as shown in Fig. 4, away therefrom.

In the example shown, the secondary air passages $e$ are arranged alternately with the passages $d$ so as to be in close proximity thereto and absorb heat therefrom in order that the secondary air may be preheated thereby, but it is to be understood that the secondary air and also the tertiary air may be preheated in any suitable manner without departing from the scope of the invention.

The floor $r$ of the combustion chamber may be adapted to rotate as shown in the example illustrated, being suitably supported on a central loose spindle $s$ and provided with a pinion $t$ by which it is rotated through the medium of a bevel wheel $v$ driven by any convenient source or power.

An inspection pit $w$ is provided for giving access to the parts underneath the combustion chamber $b$ and to the rotating gear.

The mixing chamber $c$ is provided with an explosion and cleaning door $x$ whilst the tertiary air inlet $m$ has a control damper $y$. For access to the fuel flues $d'$ is a soot-hole $z$.

In operation, fuel and the necessary amount of primary air passes into the mixing chamber $c$ from the passages $d$ and pre-heated secondary air from the passages $e$ the resultant mixture then enters the furnace through the inlets $g$ and $h$ roughly in the proportions of 75% and 25%, respectively, whereby the mixture travels along the lower part of the furnace and rises to mix with the incoming tertiary air passing through the inlets $o$, resulting in complete combustion more or less in the upper part of the furnace about the centre and resulting in more uniform heating of the articles to be treated, the waste gases passing out from the flue $p$ to the chimney flue $q$.

What I claim and desire to secure by Letters Patent is:—

1. A furnace comprising a combustion chamber, a mixing chamber for fuel and secondary air adjacent the combustion chamber, conduits from said mixing chamber to said combustion chamber arranged at different levels, a tertiary air supply chamber above the mixing chamber and adjacent the combustion chamber, conduits from said tertiary air supply chamber to the combustion chamber, separate and alternately arranged fuel and secondary air conveying passages to the mixing chamber and an exit flue to the combustion chamber for the escape of the products of combustion.

2. A furnace comprising a combustion chamber, a structure adjacent one side thereof, a fuel and secondary air mixing chamber and an overhead tertiary air supply chamber in the upper portion of said structure, one series of conduits from the mixing chamber to the combustion chamber arranged near the floor level thereof, another series of smaller conduits arranged at a higher level, conduits from the tertiary air supply chamber to the combustion chamber arranged at a still higher level, alternately arranged fuel and secondary air conveying passages to the mixing chamber in the lower portion of the structure, at least one tertiary air passage in said structure communicating with the tertiary air supply chamber, and an exit flue to the combustion chamber for the escape of the products of combustion.

In testimony whereof, I affix my signature.

CLIFFORD NELSON.